(12) United States Patent
Huang et al.

(10) Patent No.: US 11,962,878 B2
(45) Date of Patent: Apr. 16, 2024

(54) ELECTRONIC DEVICE

(71) Applicant: Acer Incorporated, New Taipei (TW)

(72) Inventors: Yu-Chin Huang, New Taipei (TW); Cheng-Mao Chang, New Taipei (TW); Li-Hua Hu, New Taipei (TW); Pao-Min Huang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 37 days.

(21) Appl. No.: 17/730,826

(22) Filed: Apr. 27, 2022

(65) Prior Publication Data
US 2023/0106722 A1 Apr. 6, 2023

(30) Foreign Application Priority Data
Sep. 30, 2021 (TW) .................. 110211528

(51) Int. Cl.
*H04N 23/51* (2023.01)
*H04N 23/55* (2023.01)
(52) U.S. Cl.
CPC ............. *H04N 23/51* (2023.01); *H04N 23/55* (2023.01)

(58) Field of Classification Search
CPC ................................ H04N 23/51; H04N 23/55
See application file for complete search history.

(56) References Cited

U.S. PATENT DOCUMENTS

2020/0064882 A1* 2/2020 Chiu ...................... H04N 23/54

* cited by examiner

*Primary Examiner* — Twyler L Haskins
*Assistant Examiner* — Fayez A Bhuiyan
(74) *Attorney, Agent, or Firm* — McClure, Qualey & Rodack, LLP

(57) ABSTRACT

An electronic device is provided, including a main body and a camera module. The camera module has a frame, a lens unit disposed in the frame, a guiding member, and a hinge. The guiding member is affixed to the main body and has a rail and a spring sheet. The hinge pivotally connects to the frame and the guiding member. When the camera module is in the retracted position, the camera module is hidden in a recess of the main body. When the camera module slides out of the recess from the retracted position along the rail into the operational position, the spring sheet is pressed by the hinge to increase the friction between the hinge and the guiding member.

10 Claims, 18 Drawing Sheets

ELECTRONIC DEVICE

CROSS REFERENCE TO RELATED APPLICATIONS

This application claims priority of Taiwan Patent Application No. 110211528, filed on Sep. 30, 2021, the entirety of which is incorporated by reference herein.

BACKGROUND OF THE INVENTION

Field of the Invention

The present invention relates to an electronic device, and, in particular, to an electronic device that has a camera module.

Description of the Related Art

With the progress being made in computer technologies, various laptop computers have been developed for people of different ages (e.g. elders and students). Moreover, when performing a video conference or live streaming, the angle of the camera on a laptop computer usually needs to be adjusted for the face and height of the user.

Therefore, designing a rotatable camera module for laptop computers and other electronic devices that is easy to use is a challenge that must be addressed.

BRIEF SUMMARY OF THE INVENTION

An embodiment of the present invention provides an electronic device that includes a main body and a camera module. The camera module has a frame, a lens unit disposed in the frame, a guiding member, and a hinge. The guiding member is affixed to the main body and has a rail and a spring sheet. The hinge pivotally connects to the frame and the guiding member. When the camera module is in the retracted position, the camera module is hidden in a recess of the main body. When the camera module slides out of the recess from the retracted position along the rail into the operational position, the spring sheet is pressed by the hinge to increase the friction between the hinge and the guiding member.

In some embodiments, the hinge has a first slope surface, and the main body has an inner wall, wherein when the camera module slides out of the recess from the retracted position along the rail into the operational position, the first slope surface contacts the inner wall.

In some embodiments, the hinge also has a second slope surface, and when the camera module rotates relative to the main body from the operational position into the tilt position, the second slope surface contacts the inner wall.

In some embodiments, an obtuse angle is formed between the first and second slope surfaces.

In some embodiments, the camera module also has a wire and a circuit board, the lens unit is disposed on the circuit board, and the hinge has a central hole, wherein the wire extends through the central hole of the hinge and connects to the circuit board.

In some embodiments, the guiding member also has an opening, and the wire extends through the central hole of the hinge and the opening of the guiding member.

In some embodiments, the opening has a longitudinal structure.

In some embodiments, the camera module also has a securing sheet, and the hinge has a flange abutting the securing sheet to restrict the hinge in a predetermined position of the frame.

In some embodiments, the electronic device further includes a front cover disposed on the main body, wherein the camera module has a lens hole aligned to the lens unit, and the lens hole is covered by the front cover when the camera module is in the retracted position.

In some embodiments, the spring sheet is formed at an end of the guiding member and has a cantilever structure.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The making and using of the embodiments of the electronic device are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
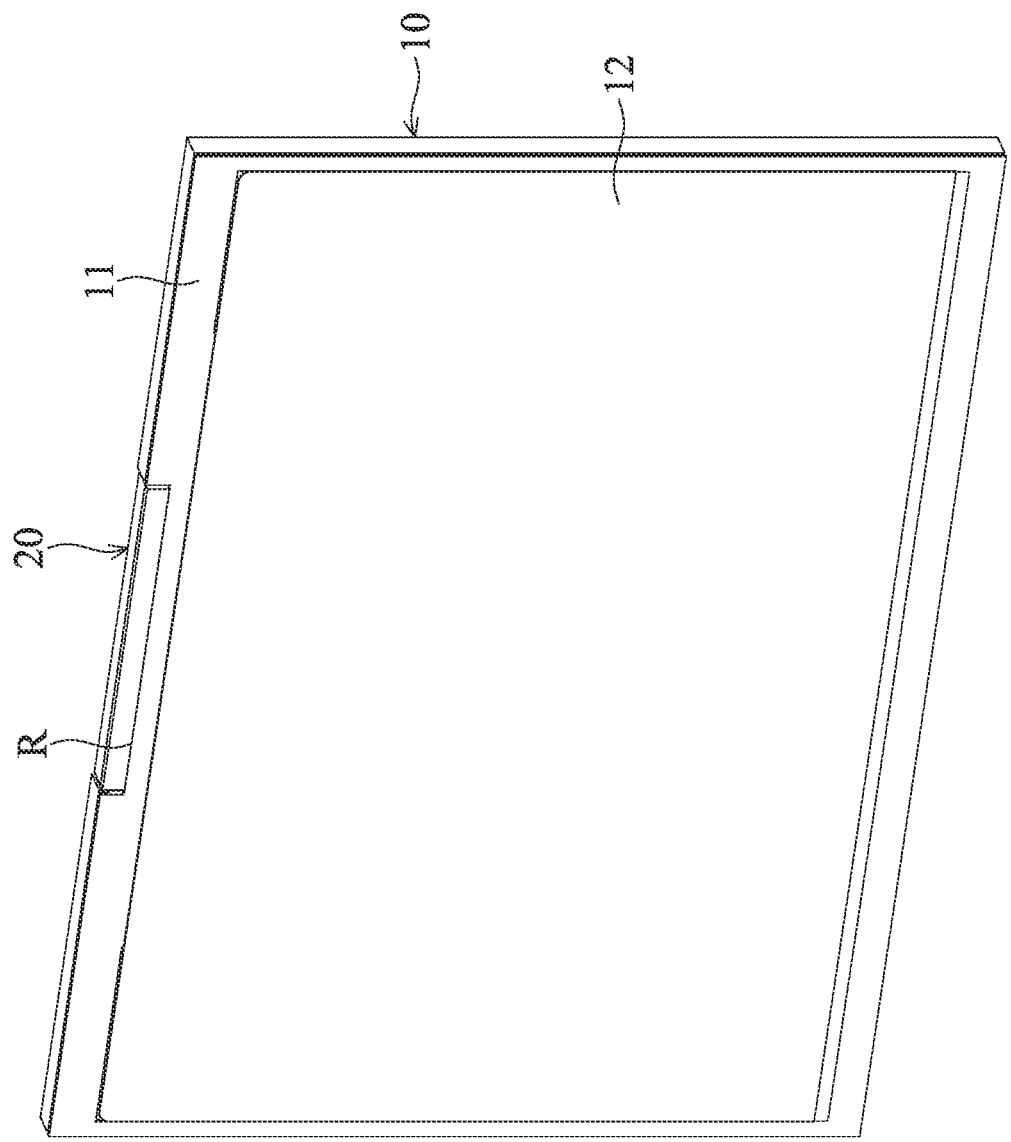
FIG. 1 is a perspective diagram of an electronic device 100 in accordance with an embodiment of the invention.
Figure 2:
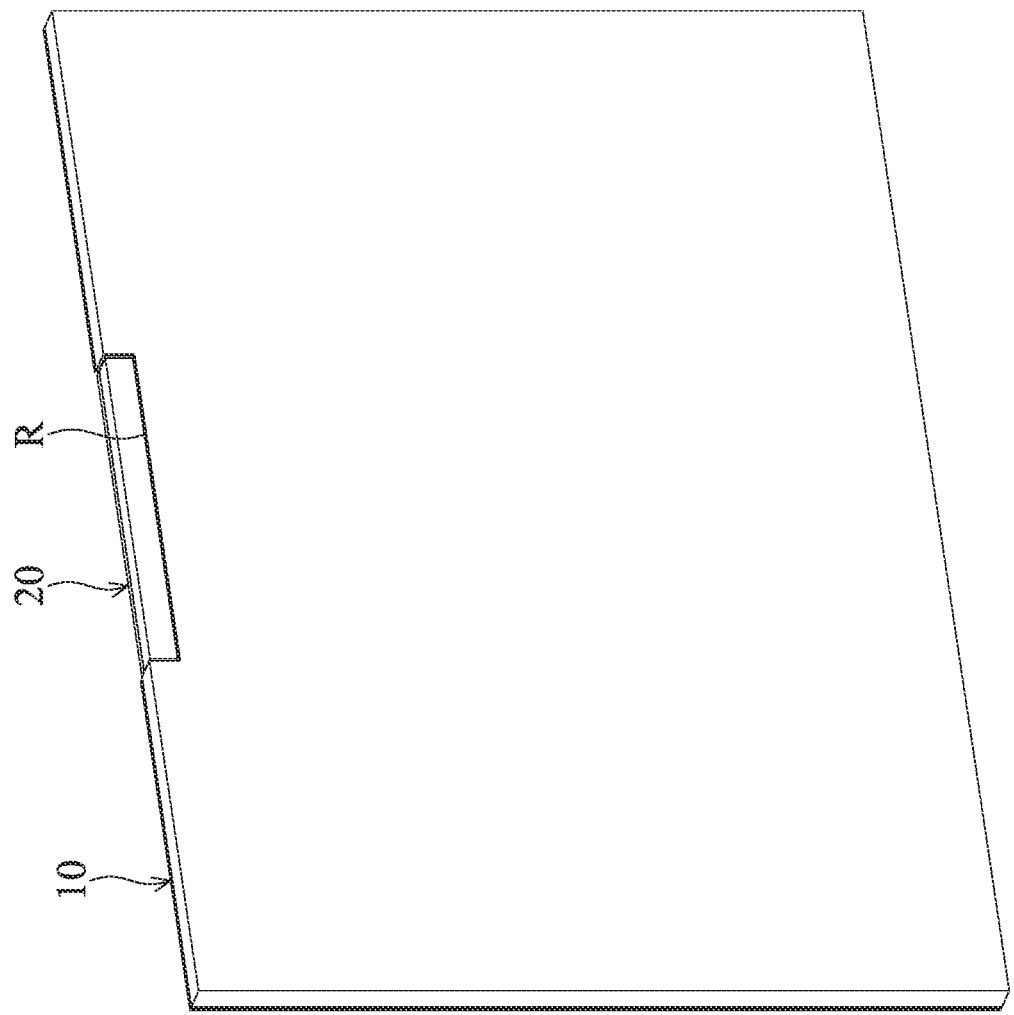
FIG. 2 is another perspective diagram of the electronic device 100 in FIG. 1.
Figure 3:
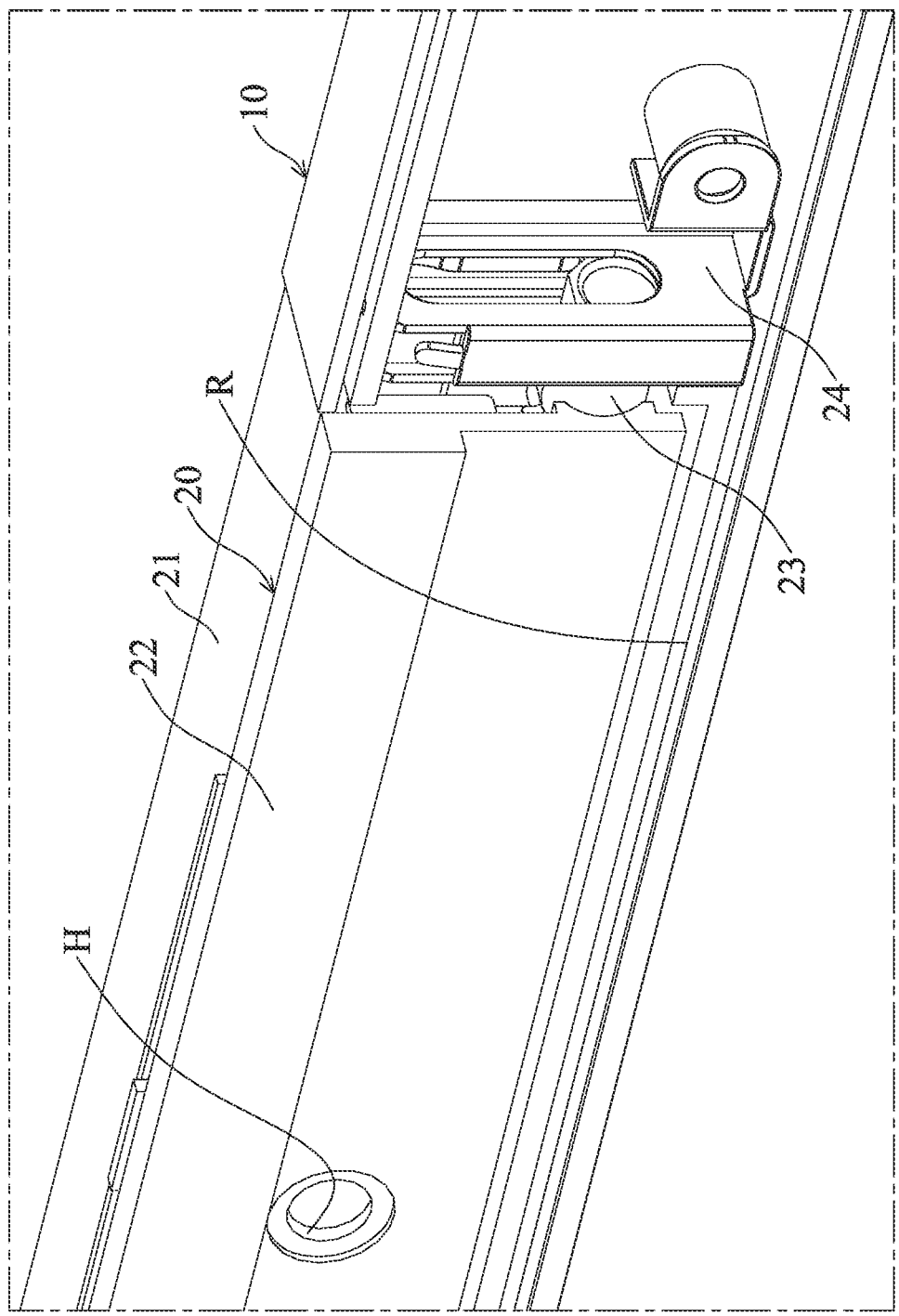
FIG. 3 is a partial enlarged view of the electronic device 100 in FIG. 1 when the front cover 11 is removed therefrom.
Figure 4:
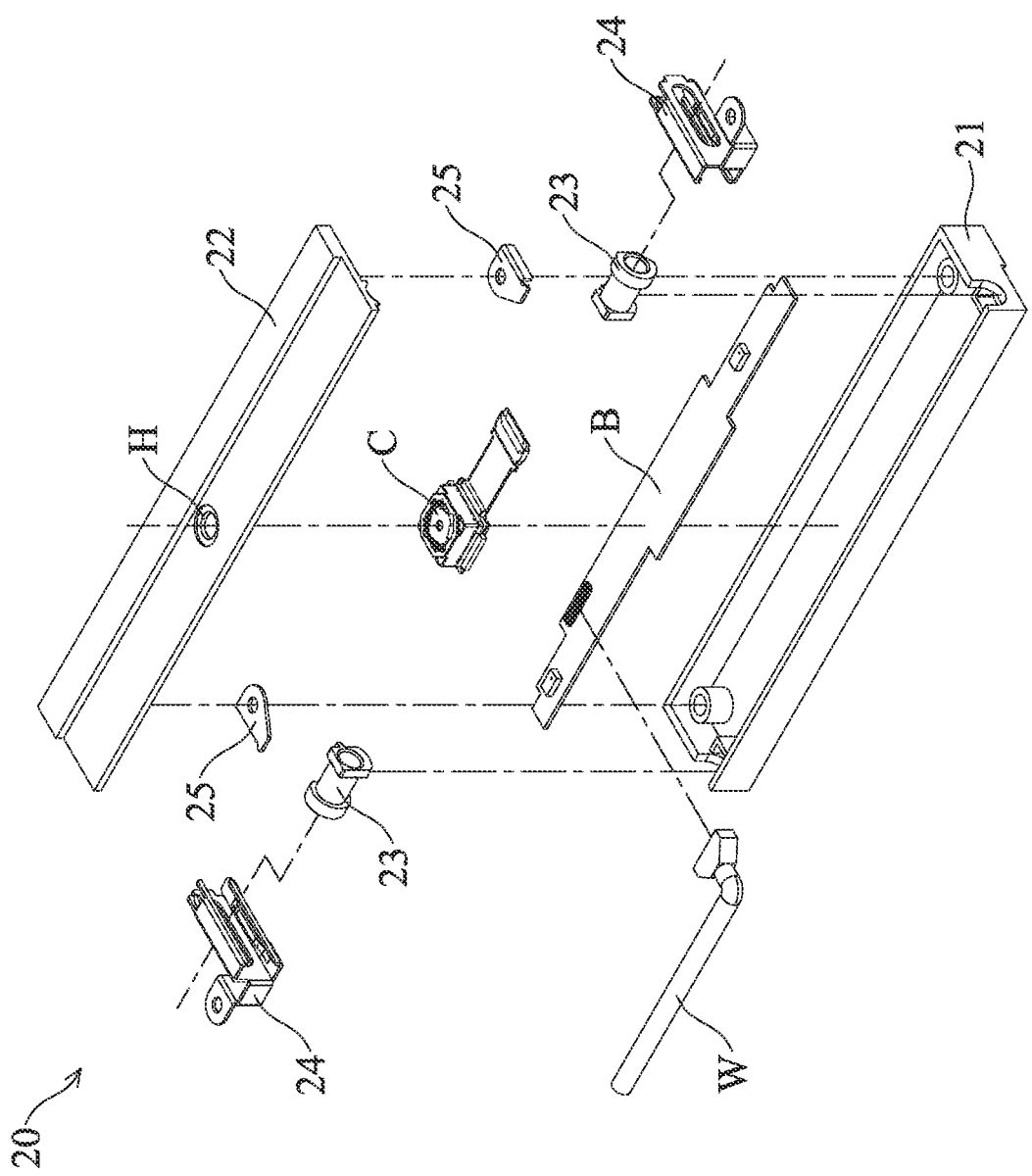
FIG. 4 is an exploded view of the camera module 20 in FIGS. 1-3.

FIG. 1 is a perspective diagram of an electronic device 100 in accordance with an embodiment of the invention. FIG. 2 is another perspective diagram of the electronic device 100 in FIG. 1. FIG. 3 is a partial enlarged view of the electronic device 100 in FIG. 1 when the front cover 11 is removed therefrom. FIG. 4 is an exploded view of the camera module 20 in FIGS. 1-3.

Referring to FIGS. 1-4, an embodiment of the electronic device 100 may be a flat display or all-in-one computer that primarily comprises a main body 10 and a camera module 20. A front cover 11 and a display module 12 are disposed on the front side of the main body 10, wherein the front cover 11 surrounds the display module 12. Moreover, a recess R is formed on the top side of the main body 10 for receiving the camera module 20.

Specifically, the camera module 20 is movably received in the recess R, and it does not protrude from the front side or the top side of the main body 10 when the electronic device 100 is not in use. Moreover, a lens hole H of the camera module 20 is blocked by the front cover 11 of the main body 10 for protecting the privacy and safety of the users.

As shown in FIGS. 3 and 4, the camera module 20 includes a frame 21, a panel 22, two hollow hinge 23, two guiding members 24, two securing sheets 25, a circuit board B, a lens unit C, and a wire W. The panel 22 and the frame 21 are connected to each other and form a housing of the camera module 20, wherein the circuit board B and the lens unit C are disposed in the housing. The lens hole H is formed on the panel 22 and aligned to the lens unit C for capturing images.

In this embodiment, the lens unit C is electrically connected to the circuit board B via a cable. The wire W extends from the circuit board B through the hinge 23 to the outside of the housing and electrically connects to a processor (not shown) in the main body 10. Hence, the image data captured by the lens unit C can be transmitted through the wire W to the processor.

The securing sheets 25 can be secured to the frame 21 by screws, and the guiding members 24 are affixed in the main body 10. The hinges 23 are disposed on opposite sides of the frame 21 and movably connected to the guiding members 24. Here, the hinges 23 can slide and rotate relative to the guiding members 24. Therefore, the housing (the frame 21 and the panel 22) and the lens unit C inside the housing can rotate and/or slide relative to the main body 10 via the movable mechanism of the hinges 23 and the guiding members 24, and the lens hole H can be exposed to a side of the main body 10 for video conference or live streaming.

Figure 5:
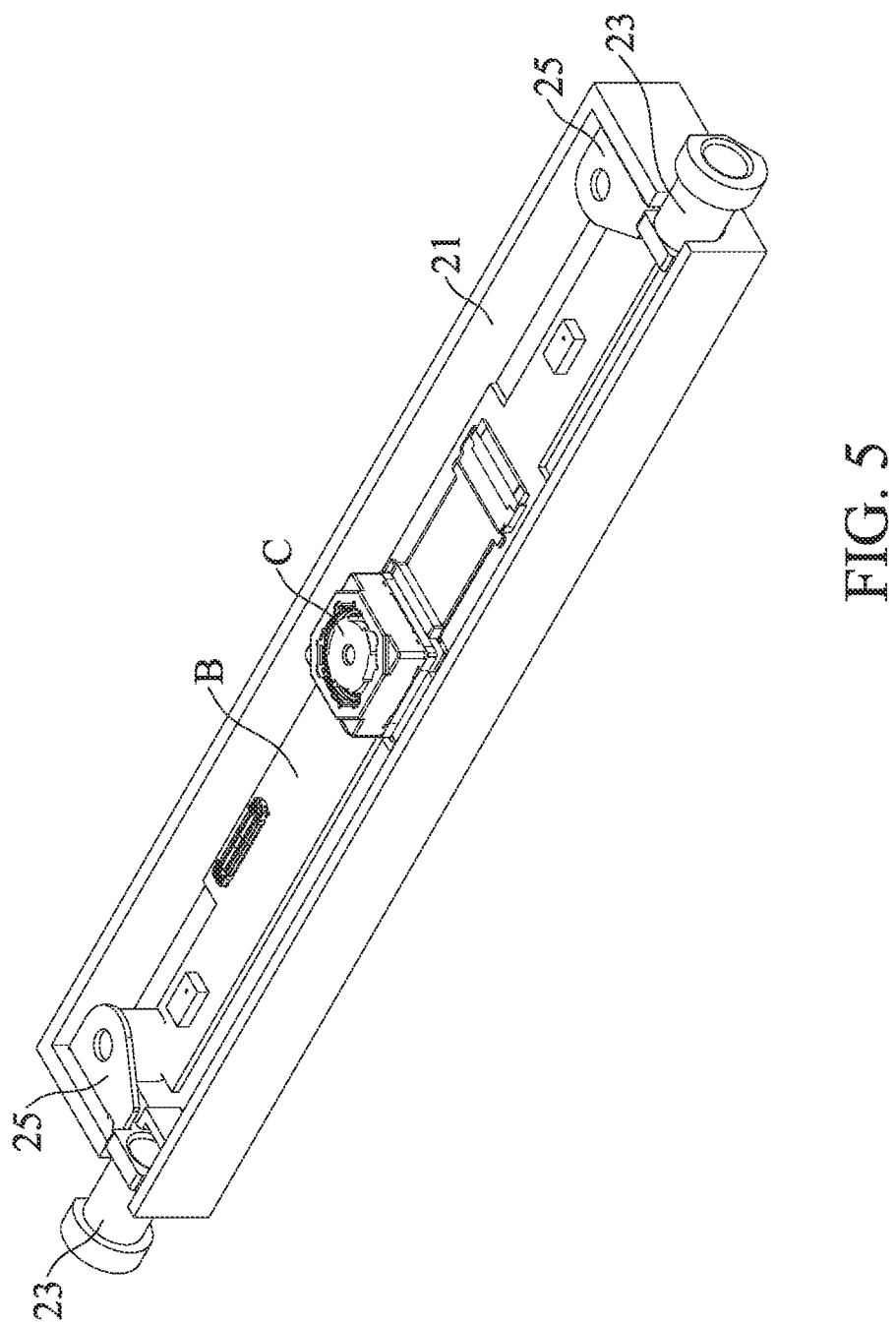
FIG. 5 is a perspective diagram of the camera module 20 when the panel 22, the wire W and the guiding members 24 are removed therefrom.
Figure 6:
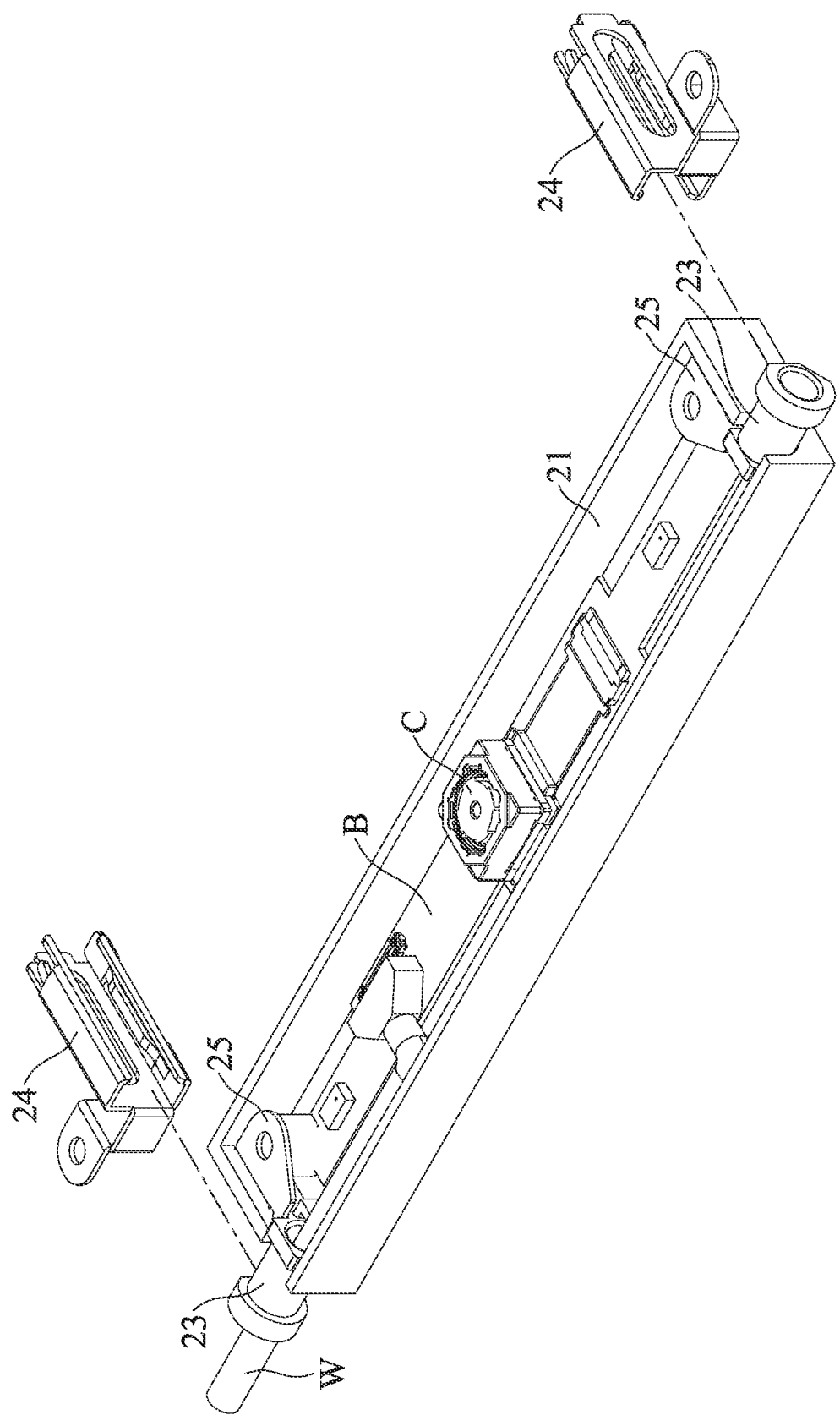
FIG. 6 is a perspective diagram showing the guiding members 24 and the hinges 23 of the camera module 20 before assembly.
Figure 7:
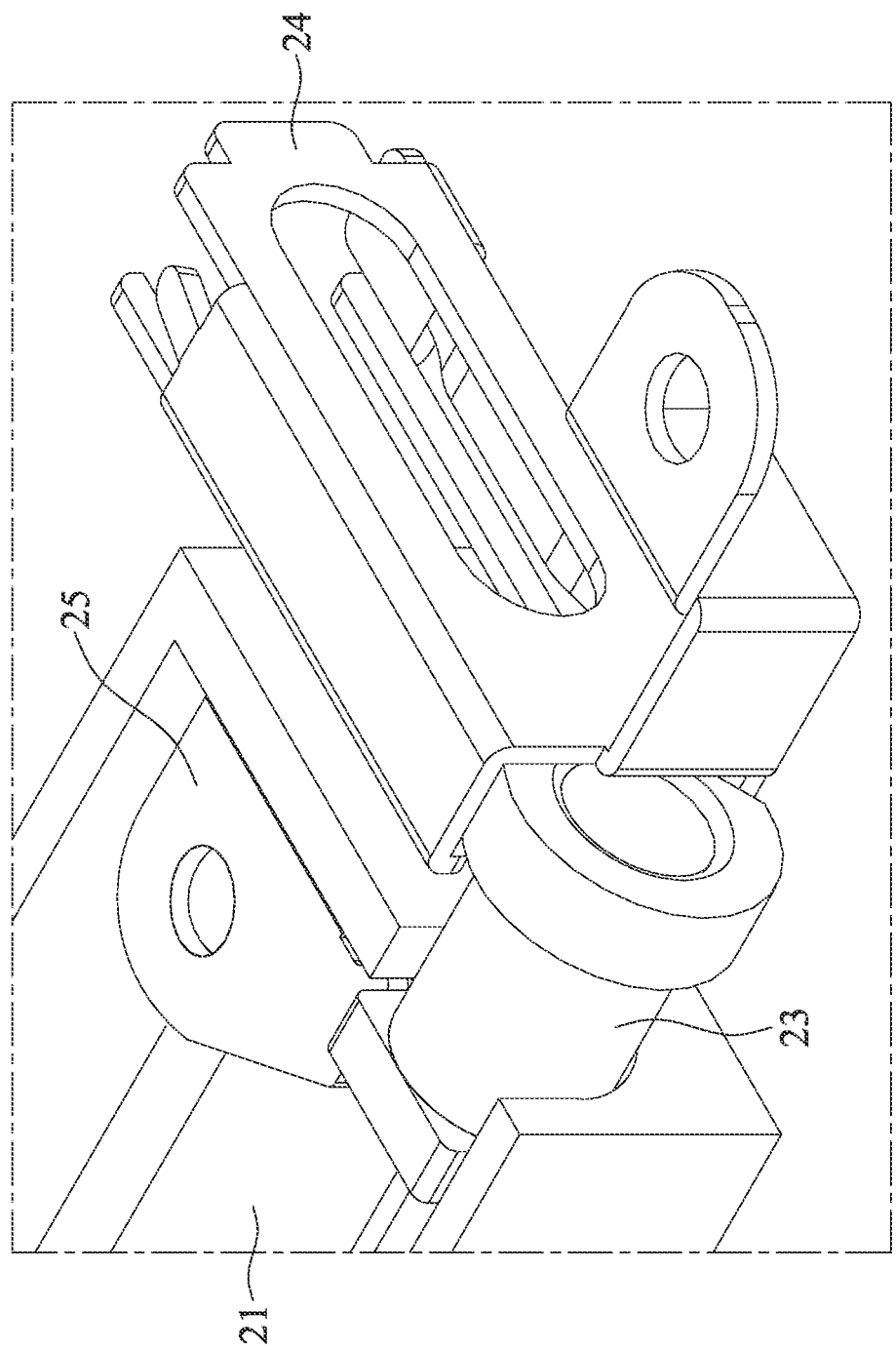
FIG. 7 is a partial enlarged view of the guiding members 24 and the hinges 23 of the camera module 20 after assembly.
Figure 8:
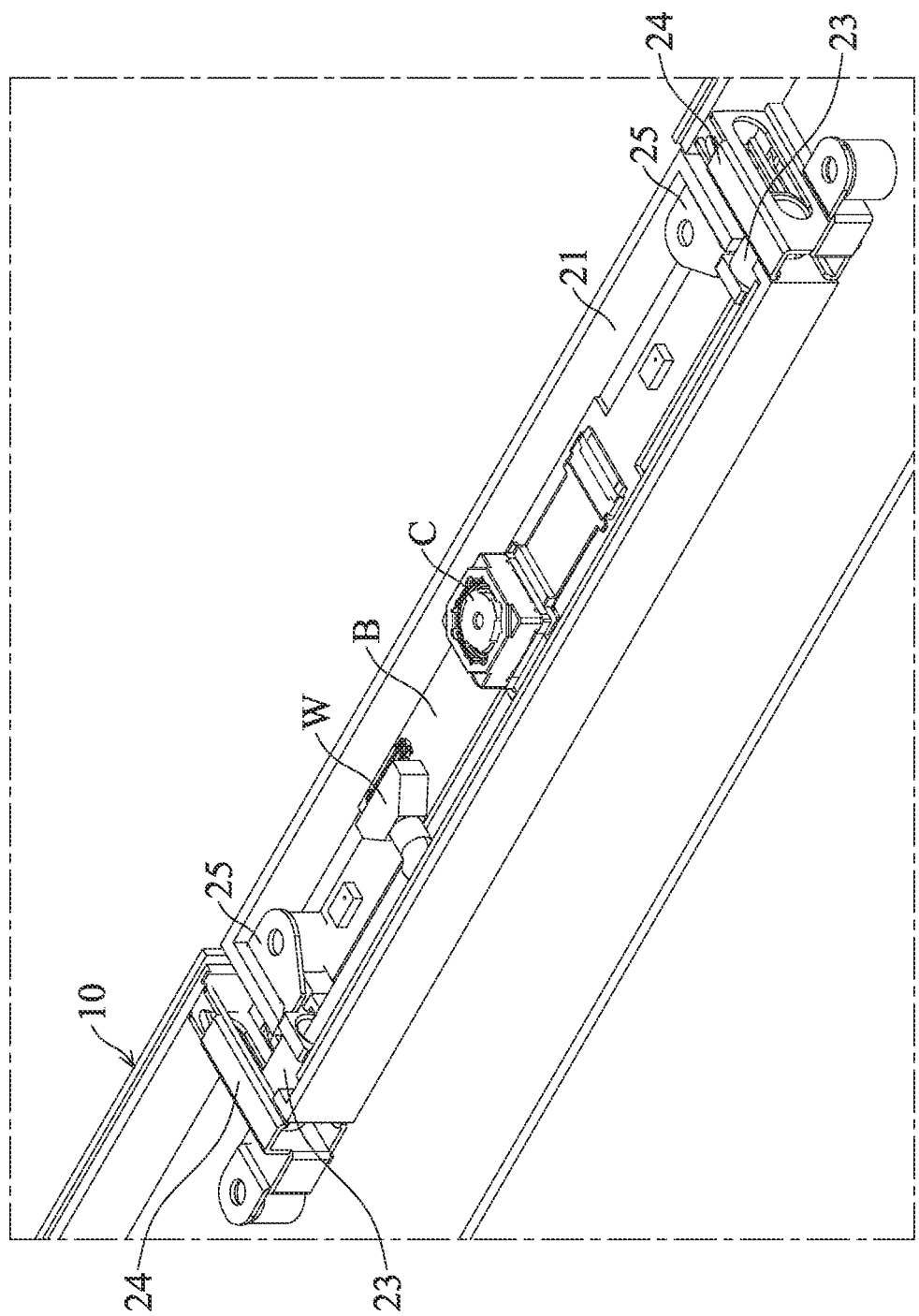
FIG. 8 is a perspective diagram of the camera module 20 pivotally connected to the main body 10 of the electronic device 100 via the hinges 23 and the guiding members 24.

FIG. 5 is a perspective diagram of the camera module 20 when the panel 22, the wire W and the guiding members 24 are removed therefrom. FIG. 6 is a perspective diagram showing the guiding members 24 and the hinges 23 of the camera module 20 before assembly. FIG. 7 is a partial enlarged view of the guiding members 24 and the hinges 23 of the camera module 20 after assembly. FIG. 8 is a perspective diagram of the camera module 20 pivotally connected to the main body 10 of the electronic device 100 via the hinges 23 and the guiding members 24.

Referring to FIGS. 5-8, the hinges 23 protrude from opposite sides of the frame 21 and movably connect to the guiding members 24. Therefore, the camera module 20 can slide and/or rotate relative to the main body 10 via the hinges 23 and the guiding members 24. As shown in FIG. 6, the wire W extends through one of the hinges 23, whereby the image data captured by the lens unit C can be transmitted through the wire W to the processor inside the main body 10 without mechanical interference from the hinges 23 and the guiding members 24.

Figure 9:
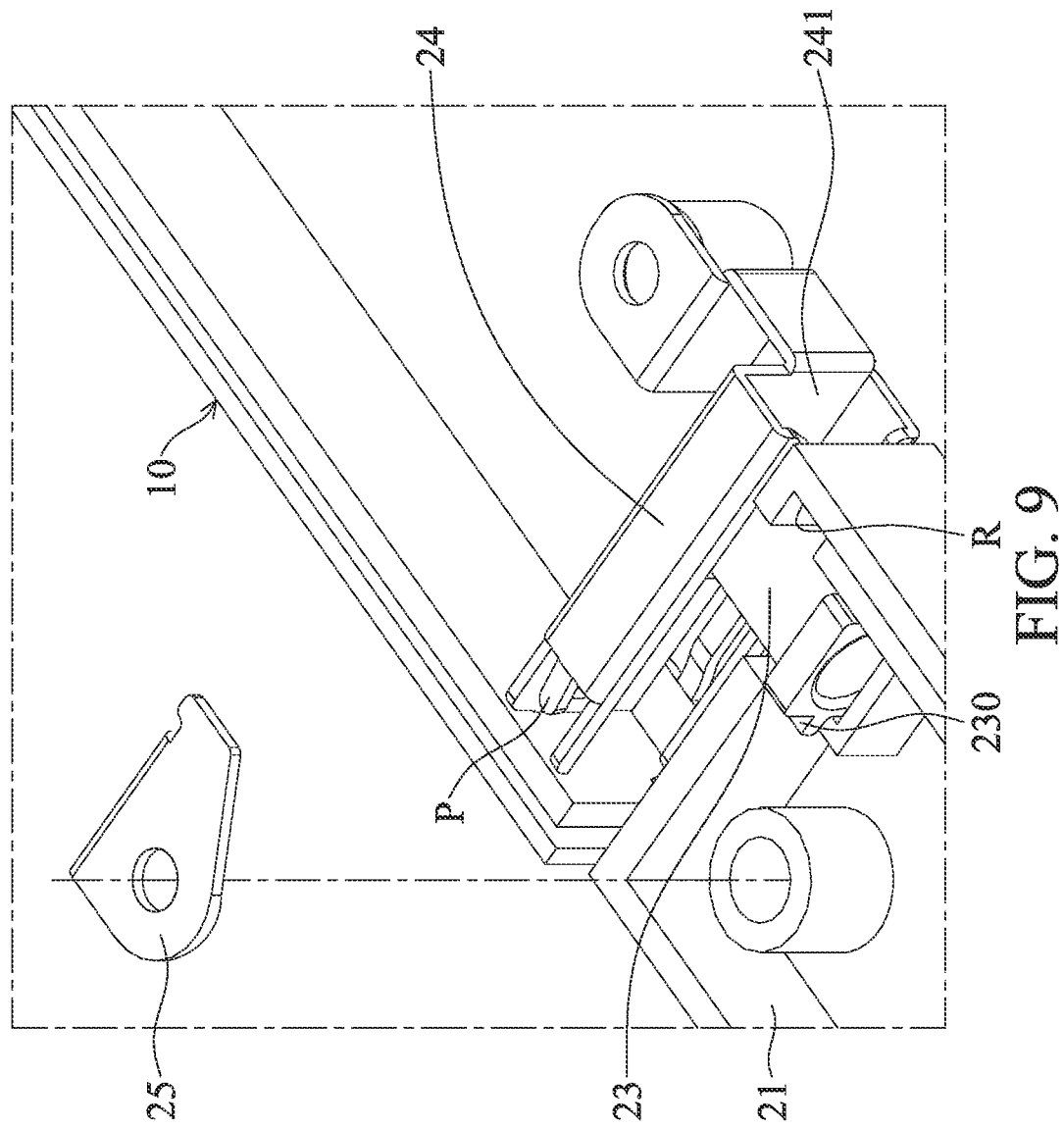
FIG. 9 is a partial enlarged view of the securing sheet 25 and the frame 21 before assembly.
Figure 10:
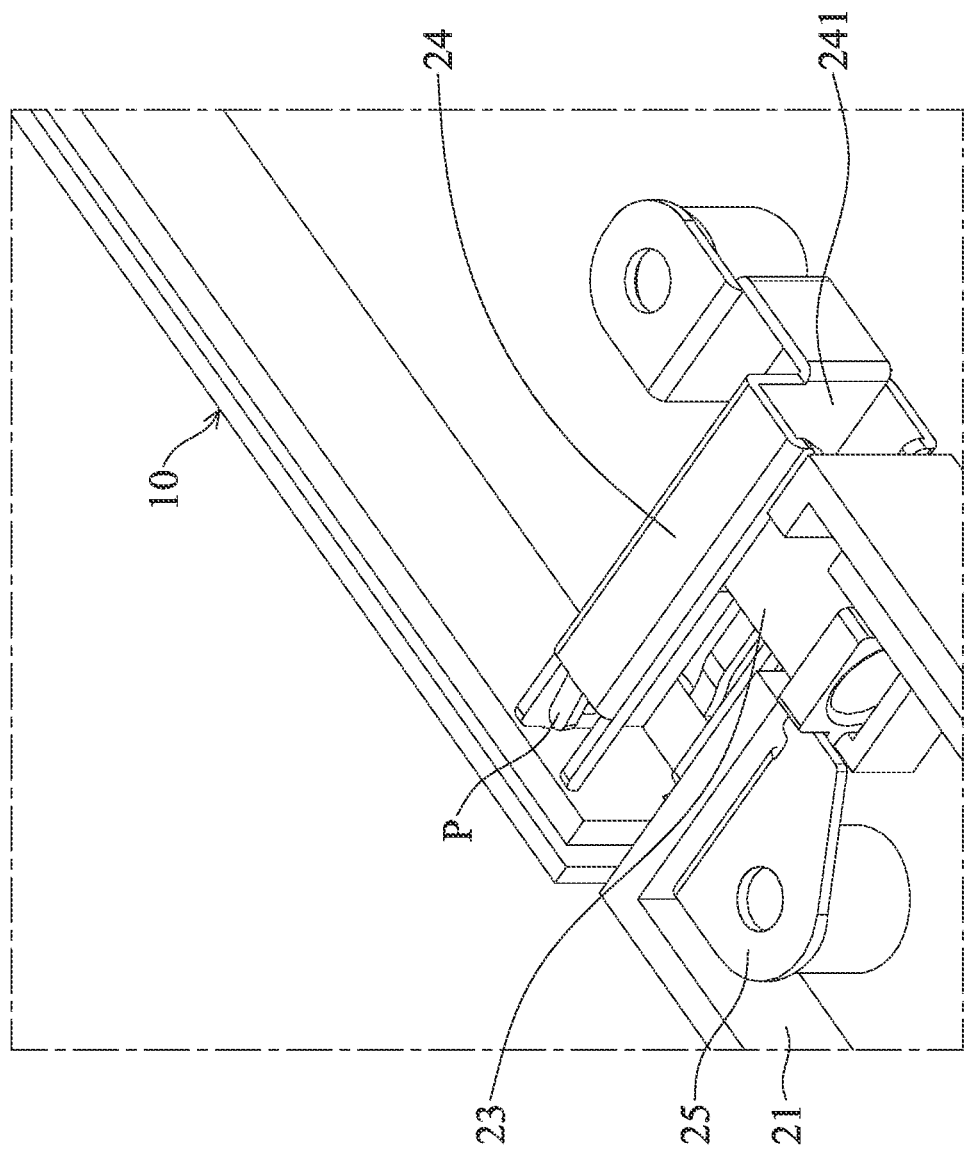
FIG. 10 is a partial enlarged view of the securing sheet 25 and the frame 21 after assembly.
Figure 11:
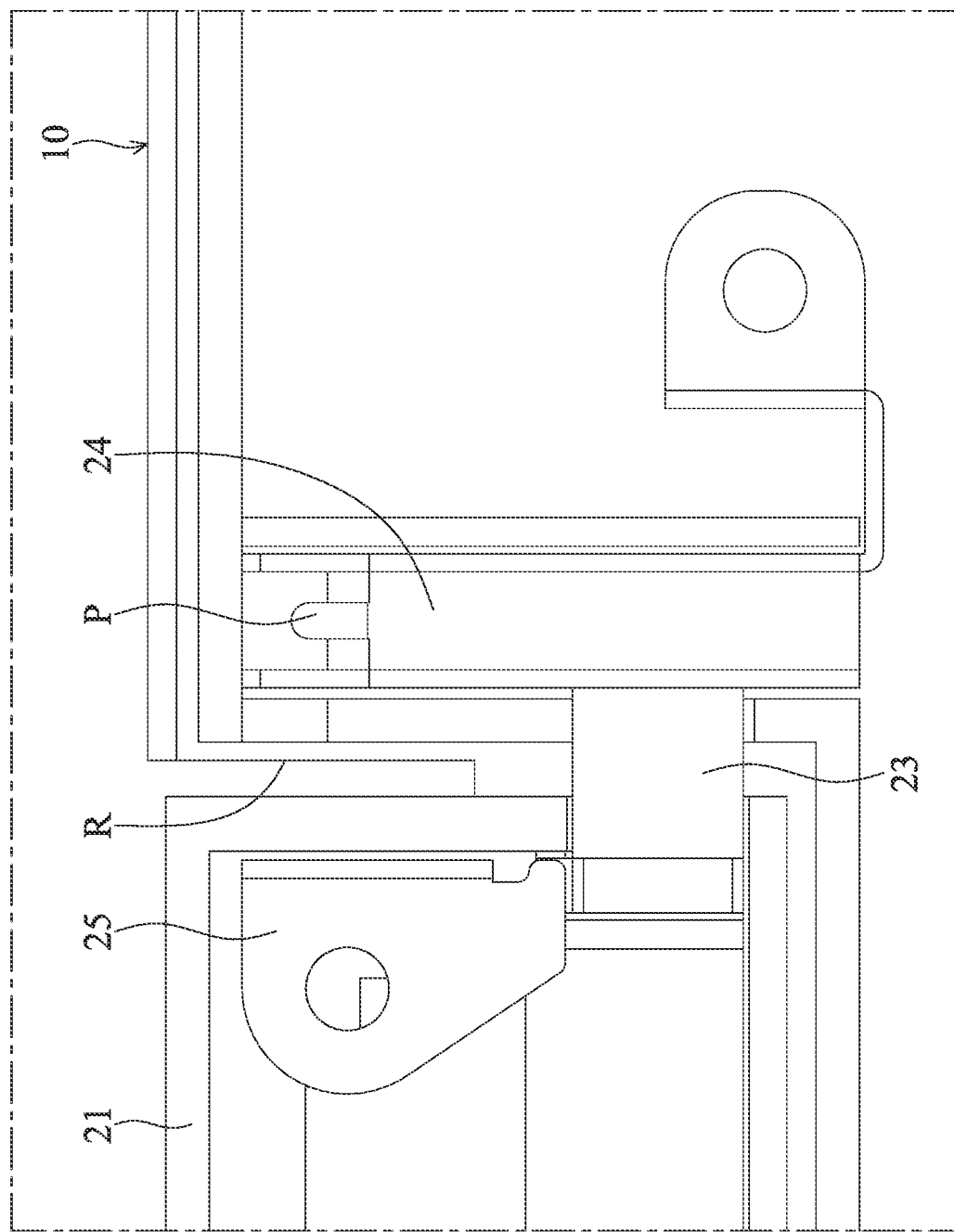
FIG. 11 is a partial front view of the securing sheet 25 and the frame 21 after assembly.
Figure 12:
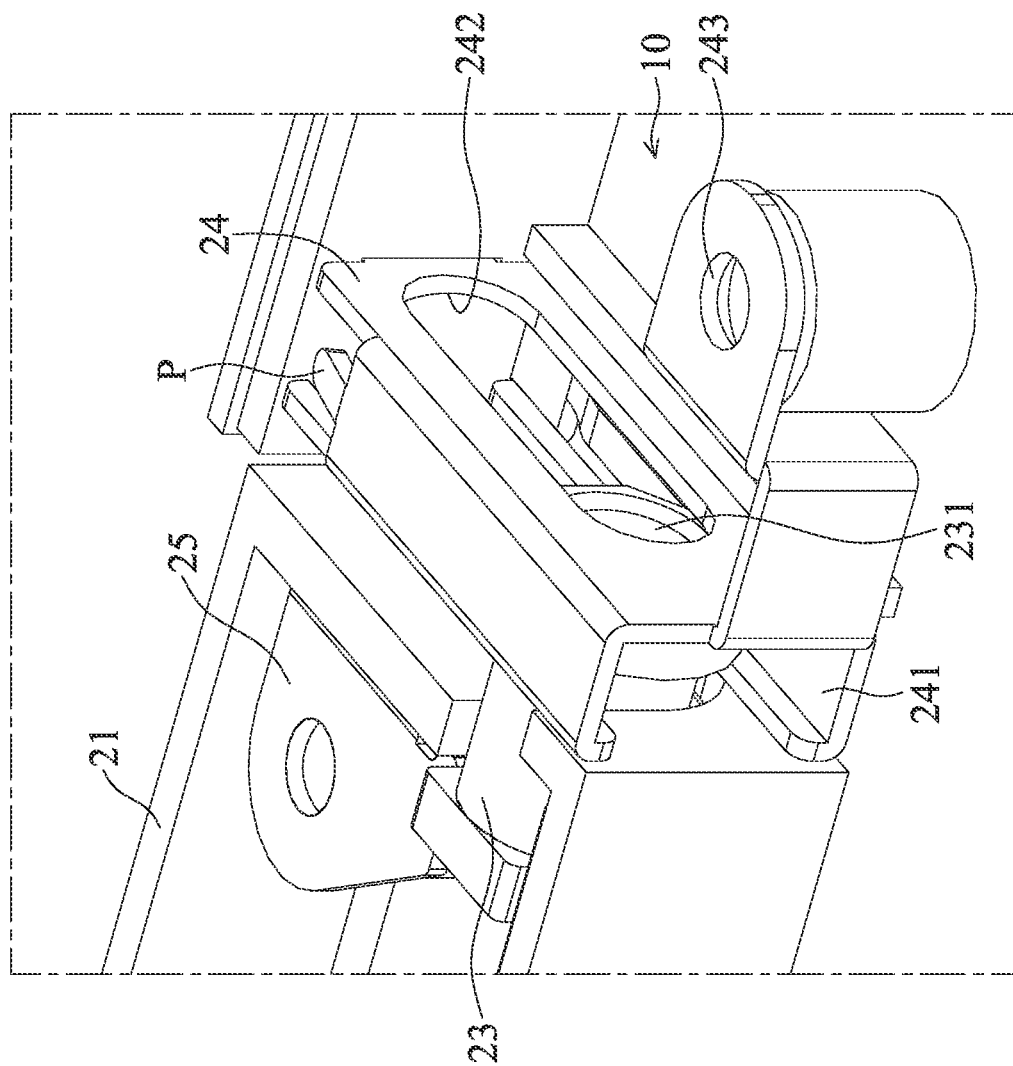
FIG. 12 is another perspective diagram showing the securing sheet 25 and the frame 21 after assembly.

FIG. 9 is a partial enlarged view of the securing sheet 25 and the frame 21 before assembly. FIG. 10 is a partial enlarged view of the securing sheet 25 and the frame 21 after assembly. FIG. 11 is a partial front view of the securing sheet 25 and the frame 21 after assembly. FIG. 12 is another perspective diagram showing the securing sheet 25 and the frame 21 after assembly.

Referring to FIGS. 9-12, the hinge 23 has a flange 230 (FIG. 9), and the securing sheet 25 can be affixed to the frame 21 by a screw (not shown). After assembly, as shown in FIG. 10, the securing sheet 25 abuts the flange 230, and the hinge 23 is restricted in a predetermined position of the frame 21 by the securing sheet 25. In this embodiment, the hinge 23 has a tubular structure and abuts the securing sheet 25, so that the hinge 23 can be prevented from separating from the frame 21.

In FIGS. 9-12, a spring sheet P is formed at an end of the guiding member 24 and spaced apart from the hinge 23 when the camera module 20 is hidden in the recess R of the main body 10 (retracted position). In contrast, when the camera module 20 slides along the rail 241 (FIGS. 9, 10, and 12) of the guiding member 24 into the operational position, the camera module 20 can protrude from the main body 10, so that the hinge 23 contacts and presses the spring sheet P of the guiding member 24 to increase the friction between them. Here, the guiding member 24 is made of a metal material, and the spring sheet P forms a cantilever structure.

Additionally, FIG. 12 shows a longitudinal opening 242 formed on the guiding member 24 and aligned to a central hole 231 of the hinge 23. During assembly, the wire W extends from the circuit board B through the central hole 231 of the hinge 23 and the opening 242 of the guiding member 24 to the processor in the main body 10. Hence, the wire W can be prevented from the mechanical interference from the hinge 23 and the guiding member 24. During assembly, a screw can be inserted through the through hole 243 of the guiding member 24, thereby securing the guiding member 24 to the main body 10.

Figure 13:
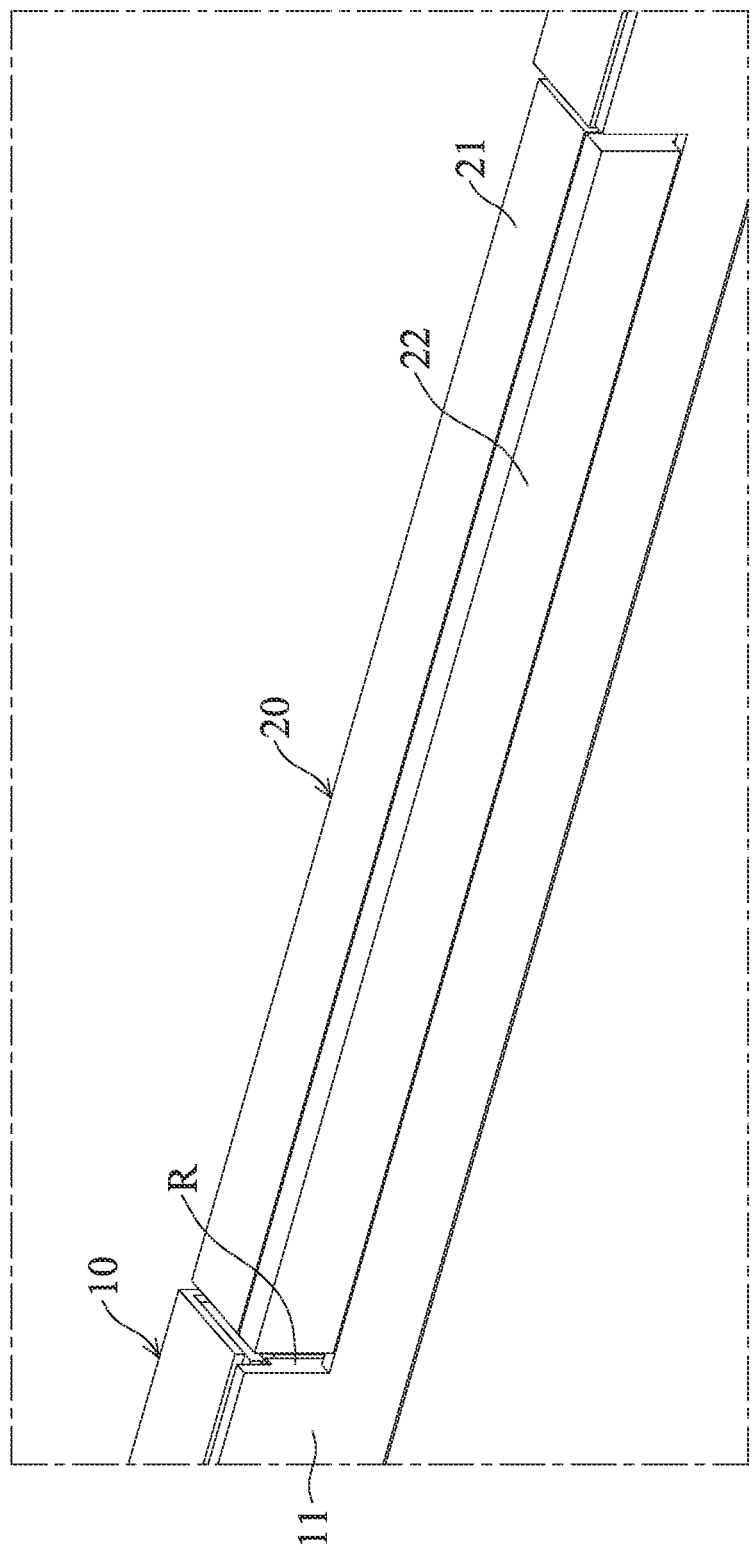
FIG. 13 is a perspective diagram of the camera module 20 when hidden in the recess R of the main body 10 (retracted position).
Figure 14:
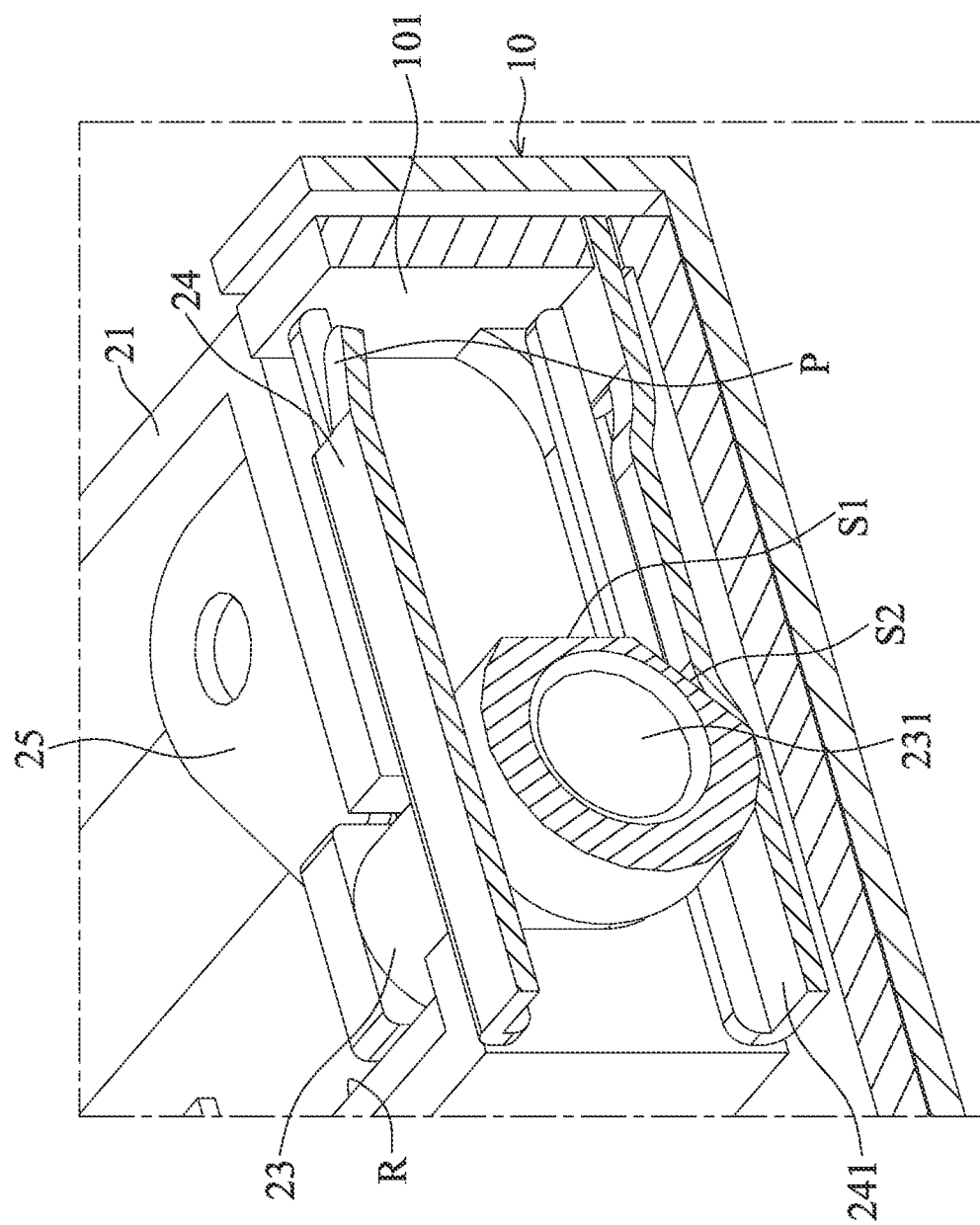
FIG. 14 is a partial enlarged cross-sectional view of the camera module 20 when hidden in the recess R of the main body 10 (retracted position).

FIG. 13 is a perspective diagram of the camera module 20 when hidden in the recess R of the main body 10 (retracted position). FIG. 14 is a partial enlarged cross-sectional view of the camera module 20 when hidden in the recess R of the main body 10 (retracted position), wherein the front cover 11 of the main body 10 and the panel 22 of the camera module 20 are omitted from FIG. 14.

Referring to FIG. 13, when the camera module 20 is located in the retracted position, it is hidden in the recess R of the main body 10. In this state, the lens hole H is blocked by the front cover 11 and not exposed to the main body 10, whereby the privacy and safety of the user can be protected while the electronic device 100 is not in use.

As shown in FIG. 14, a part of the hinge 23 is movably received in the longitudinal rail 241, and it can slide and rotate relative to the guiding member 24. Specifically, the hinge 23 has a first slope surface S1 and a second slope surface S2, wherein an obtuse angle is formed between the first and second slope surfaces S1 and S2. When the camera module 20 slides from the retracted position along the rail 241 of the guiding member 24 into the operational position, the camera module 20 protrudes from the main body 10, and the hinge 23 contacts and presses the spring sheet P of the guiding member 24 to increase the friction between them. In this state, the first slope surface S1 of the hinge 23 contacts an inner wall 101 of the main body 10, so as to restrict the camera module 20 in the operational position (FIGS. 15 and 16).

Figure 15:
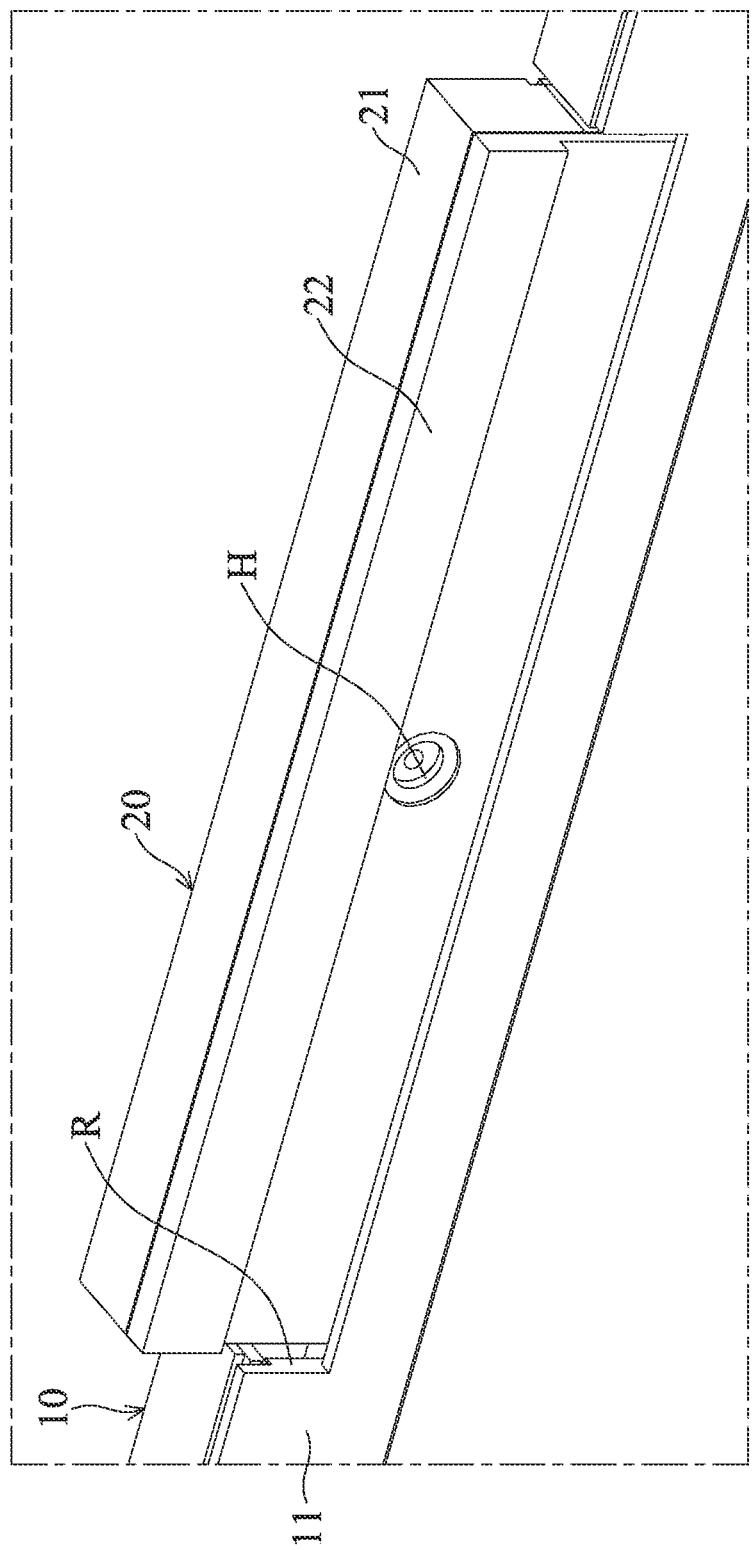
FIG. 15 is a perspective diagram of the camera module 20 when pulled out of the recess R into the operational position.

FIG. 15 is a perspective diagram of the camera module 20 when pulled out of the recess R into the operational position. FIG. 16 is a partial enlarged cross-sectional view of the camera module 20 when pulled out of the recess R into the operational position, wherein the front cover 11 of the main body 10 and the panel 22 of the camera module 20 are omitted from FIG. 16.

Figure 16:
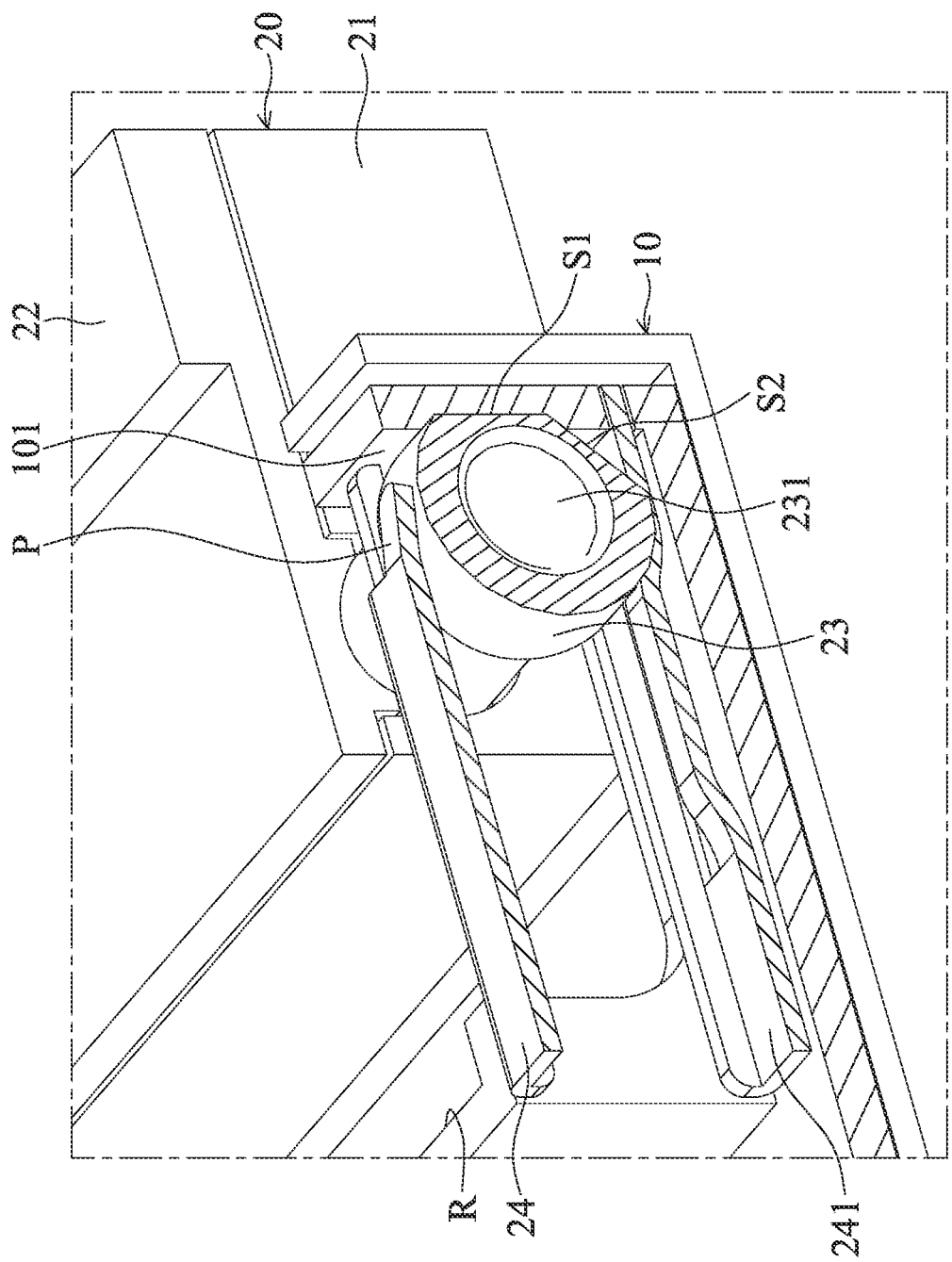
FIG. 16 is a partial enlarged cross-sectional view of the camera module 20 when pulled out of the recess R into the operational position.

Referring to FIGS. 15 and 16, when the camera module 20 is pulled from the retracted position in the recess R of the main body 10 into the operational position, the lens hole H is exposed to the main body 10. In this state, the hinge 23 contacts and presses the spring sheet P of the guiding member 24 to increase the friction between them, and the first slope surface S1 of the hinge 23 contacts the inner wall 101 of the main body 10, thereby restricting the camera module 20 in the operational position and preventing unintentional rotation between the hinge 23 and the guiding member 24.

Figure 17:
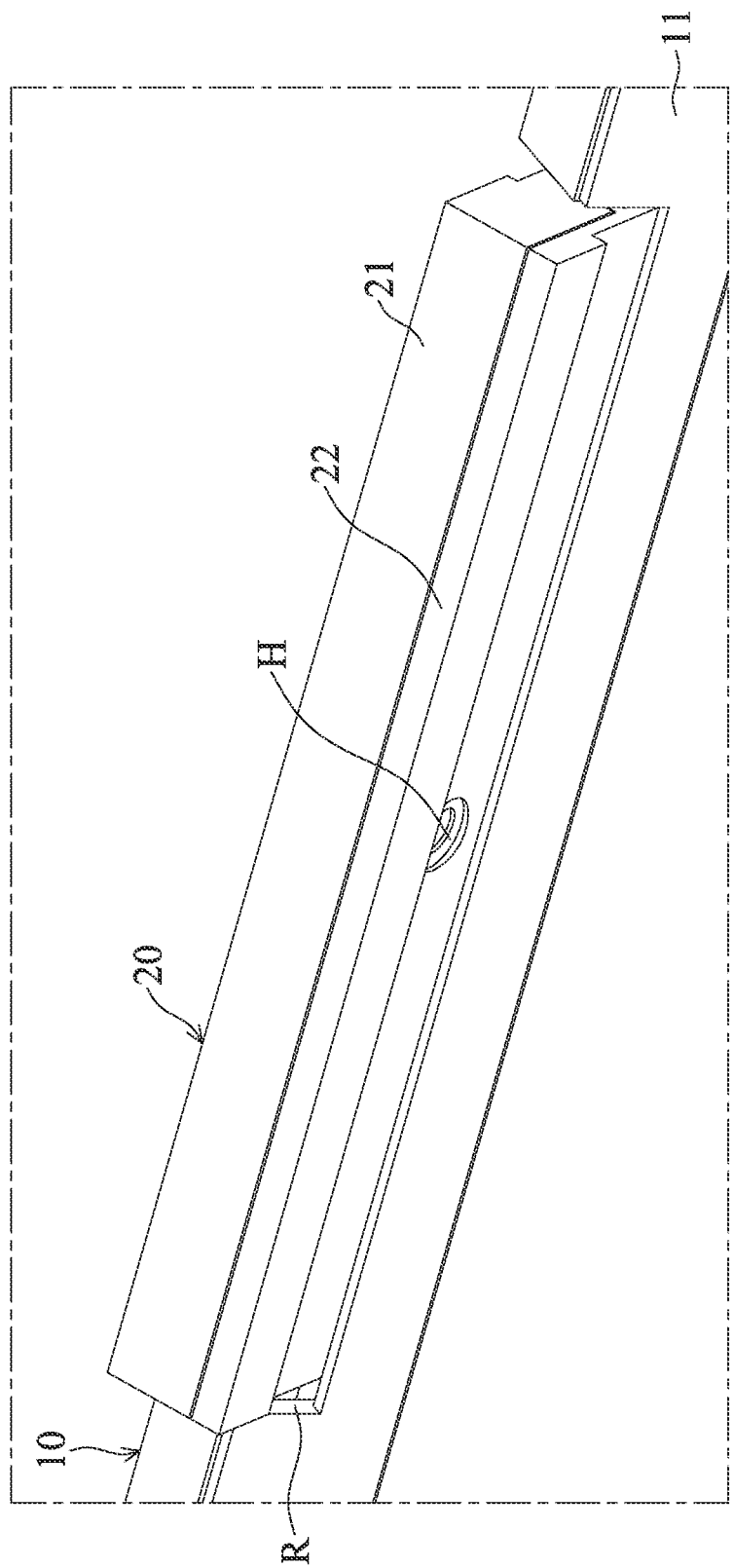
FIG. 17 is a perspective diagram of the camera module 20 when rotated relative to the guiding member 24 from the operational position (FIGS. 15 and 16) into the tilt position.
Figure 18:
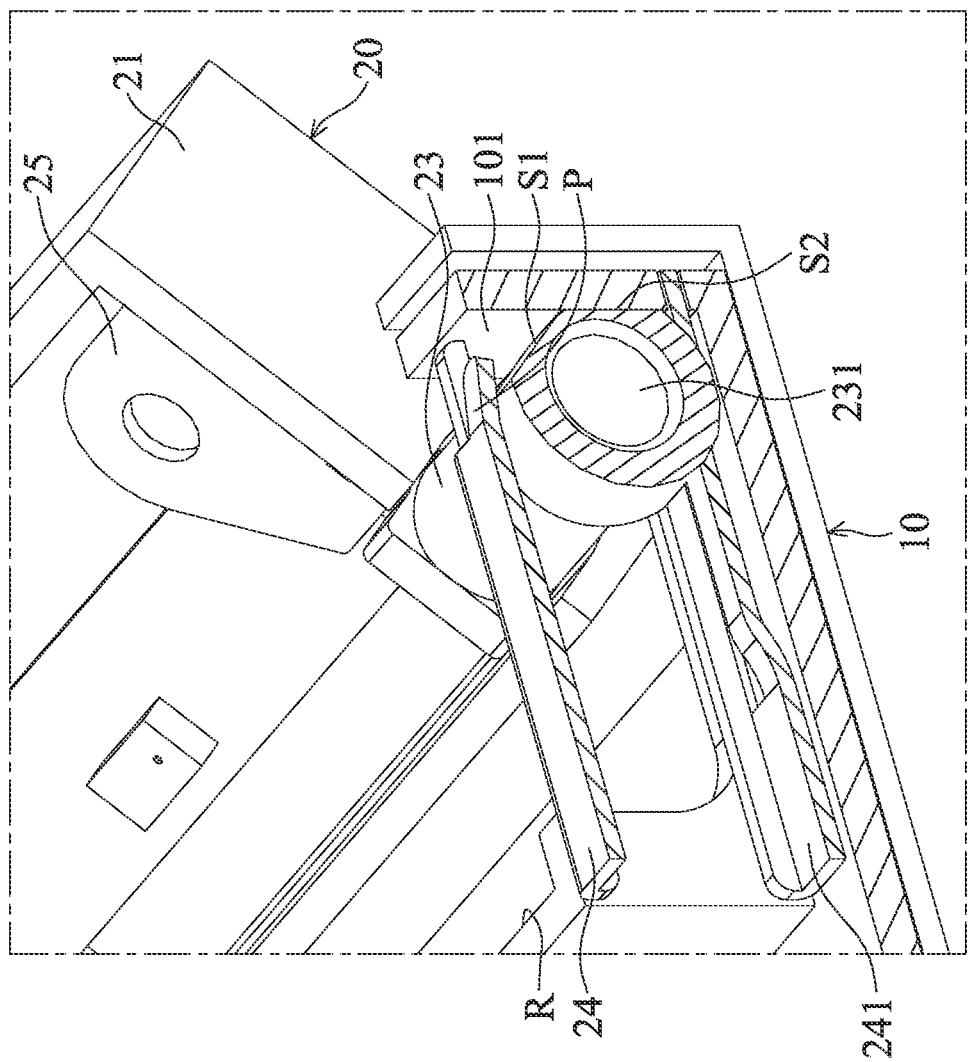
FIG. 18 is a partial enlarged cross-sectional view of the camera module 20 when rotated relative to the guiding member 24 from the operational position (FIGS. 15 and 16) into the tilt position.

FIG. 17 is a perspective diagram of the camera module 20 when rotated to relative to the guiding member 24 from the operational position (FIGS. 15 and 16) into the tilt position. FIG. 18 is a partial enlarged cross-sectional view of the camera module 20 when rotated relative to the guiding member 24 from the operational position (FIGS. 15 and 16) into the tilt position, wherein the front cover 11 of the main body 10 and the panel 22 of the camera module 20 are omitted from FIG. 18.

Referring to FIGS. 17 and 18, after the camera module 20 is pulled out of the recess R into the operational position (FIGS. 15 and 16), the user can further push the camera module 20 to rotate with respect to the main body 10, so that the hinge 23 of the camera module 20 rotates at an angle relative to the guiding member 24 into the tilt position.

In this state, the second slope surface S2 of the hinge 23 contacts the inner wall 101 of the main body 10 (FIG. 18), thereby restricting the camera module 20 in the tilt position and preventing unintentional rotation between the hinge 23 and the guiding member 24.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An electronic device, comprising:
   a main body, having a recess;
   a camera module, having:
   a frame;
   a lens unit, disposed in the frame;
   a guiding member, affixed to the main body and having a rail and a spring sheet; and
   a hinge, pivotally connected to the frame and the guiding member, wherein the hinge is slidable along the rail;
   wherein when the camera module is in a retracted position, the camera module is hidden in the recess, and when the camera module slides out of the recess from the retracted position along the rail into an operational position, the spring sheet is pressed by the hinge to increase the friction between the hinge and the guiding member.

2. The electronic device as claimed in claim 1, wherein the hinge has a first slope surface, and the main body has an inner wall, wherein when the camera module slides out of the recess from the retracted position along the rail into the operational position, the first slope surface contacts the inner wall.

3. The electronic device as claimed in claim 2, wherein the hinge further has a second slope surface, and when the camera module rotates relative to the main body from the operational position into a tilt position, the second slope surface contacts the inner wall.

4. The electronic device as claimed in claim 3, wherein an obtuse angle is formed between the first and second slope surfaces.

5. The electronic device as claimed in claim 1, wherein the camera module further has a wire and a circuit board, the lens unit is disposed on the circuit board, and the hinge has a central hole, wherein the wire extends through the central hole of the hinge and connects to the circuit board.

6. The electronic device as claimed in claim 5, wherein the guiding member further has an opening, and the wire extends through the central hole of the hinge and the opening of the guiding member.

7. The electronic device as claimed in claim 6, wherein the opening has a longitudinal structure.

8. The electronic device as claimed in claim 1, wherein the camera module further has a securing sheet, and the hinge has a flange abutting the securing sheet to restrict the hinge in a predetermined position of the frame.

9. The electronic device as claimed in claim 1, further comprising a front cover disposed on the main body, wherein the camera module has a lens hole aligned to the lens unit, and the lens hole is blocked by the front cover when the camera module is in the retracted position.

10. The electronic device as claimed in claim 1, wherein the spring sheet is formed at an end of the guiding member and has a cantilever structure.

\* \* \* \* \*